United States Patent

[11] 3,581,524

| [72] | Inventor | Alfred Pitner<br>Paris, France |
|---|---|---|
| [21] | Appl. No. | 741,441 |
| [22] | Filed | July 1, 1968 |
| [45] | Patented | June 1, 1971 |
| [73] | Assignee | Nadella S. A.<br>Rueil-Malmaison, France |
| [32] | Priority | July 13, 1967 |
| [33] | | France |
| [31] | | 114230 |

[54] SEALING DEVICE FOR A BEARING MOUNTED ON A SHAFT
8 Claims, 3 Drawing Figs.

[52] U.S. Cl. .................................................. 64/17,
308/187.1
[51] Int. Cl. ..................................................... F16d 3/26,
F16c 39/06
[50] Field of Search .......................................... 308/36.1,
187.1, 187.2; 277/95, 205, 82; 64/17 A

[56] References Cited
UNITED STATES PATENTS
3,220,756 11/1965 Templeton .................. 308/36.1

| 3,457,732 | 7/1965 | Delouzon | 64/17 |
| 2,773,367 | 12/1956 | Slaght | 277/205X |
| 2,896,433 | 7/1959 | Hempel | 64/17A |
| 2,957,713 | 10/1960 | Herbenar | 277/152X |
| 3,124,369 | 3/1964 | Traugott | 308/187.1 |
| 3,352,127 | 11/1967 | Skinner | 64/17A |
| 2,916,896 | 12/1959 | Miller | 64/17A |
| 3,428,345 | 2/1969 | Ryszewski | 308/36.1 |

FOREIGN PATENTS
1,001,170   8/1965   Great Britain ............... 64/17A

*Primary Examiner*—Fred C. Mattern, Jr.
*Assistant Examiner*—Frank Susko
*Attorney*—Robert E. Burns ABSTRACT: A sealing device is disclosed for sealing the connection between a shaft shoulder and a bearing mounted on the shaft. The device comprises a ring having a nonmetallic surface which has cylindrical or conical flange covering the cylindrical outer face of either or both of the bearing and the shaft shoulder.

PATENTED JUN 1 1971    3,581,524

SEALING DEVICE FOR A BEARING MOUNTED ON A SHAFT

The present invention relates to the utilization as sealing means of a ring of elastomer or plastic material which is mounted with a tight fit on the outer face of a shaft, and more particularly a journal, and axially gripped between a lateral face of a bearing extending around the shaft and a shoulder integral with the shaft whereby the ring effectively seals the bearing by pressure contact in three zones.

Such an arrangement is frequently encountered in assemblies for universal joint devices in which four branches of a cross member, which form journals, are mounted by means of four bearings having rolling elements or antifriction bushings in supports, termed yokes, integral with rotating shafts and adapted to transmit the motion from one of the shafts to the other. Examples of such an assembly with incorporated sealing means are given, for example in French Pat. Nos. 1,217,643 and 1,228,019.

Whether the ring has s solid section, for example an O- or quadrilobar section, or an open section, for example a V-section (which improves its elasticity in the axial direction) the assembly obtained, although it usually affords an effective seal, has the disadvantage that the face in contact with the bearing or the shoulder is exposed to the action of violent projections of solid particles or liquids, such as high-pressure water employed in washing for in particular cleaning projections of salt (resulting from operations facilitating the melting of snow on highways) from the underside of the vehicle.

In the first case of the O- or like-sectioned ring having a low elasticity in the axial direction of the journal, the edge of the ring in operation can, under certain conditions, become slightly out of contact with its corresponding face and the seal may be insufficient.

In the second case of the V- or like-sectioned ring having high axial elasticity, the direct projection of a violent jet on the edge of the lip could fold it back, at least locally, and create an opening through which the water can enter. This water often includes therein some foreign bodies which could result in a slow destruction inside the journal.

To overcome this drawback, the use of an L- or U-sectioned metal ring has been proposed which surrounds the sealing ring and replaces one or two of the zones of contact under pressure between the elastomer and the metal by zones of metal-to-metal contact. The obvious drawback of this arrangement is the reduction in the effectiveness of the ring, since the contacting metal surfaces are unsuitable for effecting a true seal.

There has also been proposed the use, without eliminating the three zones of contact, of a relatively rigid ring of metal or plastic material having an L-section, or including such a section, and combined with a V-sectioned ring. This latter arrangement is also very effective but it requires two distinct members which increases the price and detrimentally complicates the assembly.

The object of the present invention is to provide a simple and inexpensive device which retains the qualities of the system employing a single elastomer ring or a ring of deformable plastic material and yet ensures protection and a possible stiffening of the lips which opposes any undesired deformation of the latter.

This improvement comprises forming on a ring of one of the aforementioned proposed types, having either low or high axial elasticity and on the periphery of at least one of the zones of axial contact and independently of this zone of contact, a cylindrical or conical circular flange which covers, with or without contact, a cylindrical portion of one of the elements to which pertains one of the axial bearing faces of the sealing ring.

In this way, at least one of the faces or lips which are in pressure contact are protected. Moreover, depending upon the dimensions of the elements, this lip could be supported, if need be, by providing a local stiffening which would ensure the required qualities independently of the axial or radial elasticity of the ring as a whole. While effectively supporting this lip, the latter is allowed to take up any necessary position for compensating the tolerances existing in the space between the bearing and the shoulder of the journal, which are usually to within several tenths of a millimeter.

Further, for example in the case of universal joint, when the circular flange covers the bearing, the ring could be placed in position by passing it through a bore having the diameter of the bearing, that is, a diameter less than that of the largest part of the ring. In such an arrangement in addition to the elasticity of the cylindrical or conical circular flange, the body of the ring or the other flange should have a diameter less than that of the bore.

Further features and advantages of the invention will be apparent from the ensuing description when taken with reference to the accompanying drawing in which.

Figure 1:
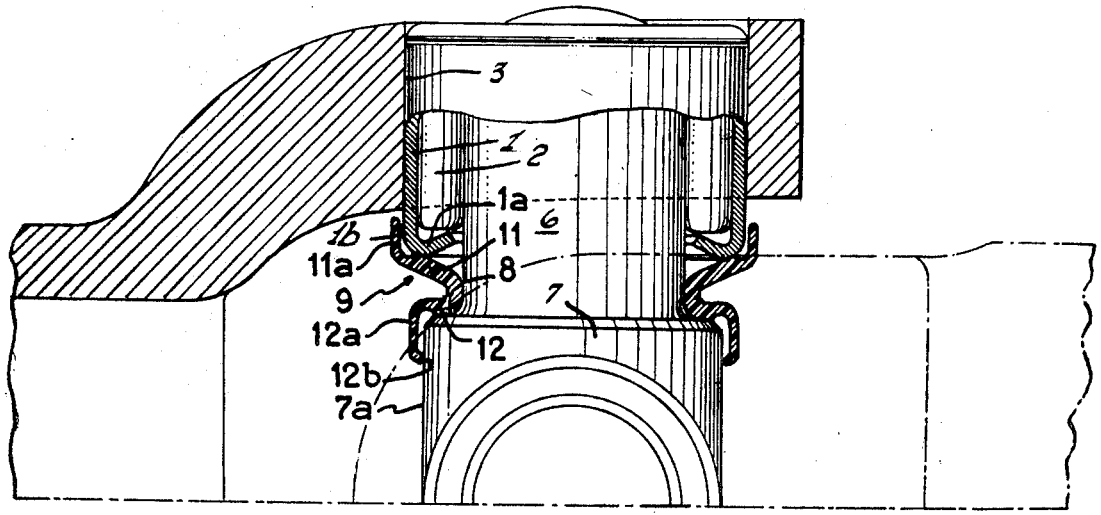
FIG. 1 is a sectional view of a device according to the invention for sealing a needle bearing.
Figure 3:
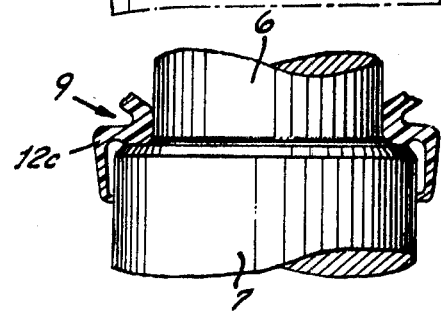

FIG. 3 yoke of a universal joint and caps a sectional view of another modification of the device shown in FIG. 1.

A bearing 1 having needles 2 is fitted in a bore 3 of a branch 4 of the yoke of a universal joint and caps the end of a journal 6. The latter defines a shoulder 8 with the body of the cross 7.

An elastomer sealing ring 9 radially grips the outer face of the journal 6 and is axially gripped by lips or radially outwardly extending projections 11 and 12 between the bent over flange 1a of the bearing 1 and the shoulder 8.

For protecting and stiffening purposes, the lips 11 and 12 are extended by means of cylindrical flanges 11a and 12a, respectively, which cover the adjacent portions of the outer cylindrical face 1b of the bearing 1 and the outer face 7a of the body of the cross 7. A radial clearance is provided between the flange 11a and the face of the bearing whereas the flange 12a is applied against the body of the cross 7 through an inner bead or rib 12b. A substantially V-sectioned annular recess will be observed between the flanges 11a and 12a.

The ring 9 is placed in position on the cross through the bore 3 before the bearing 1 is fitted on the journal 6. Bearing in mind that the flange 11a has a diameter obviously greater than that of the bore 3 and must shrink by elastic radial deformation and in order to ensure that the flange 12a does not roll up by adherence to the face of the bore 3, which would make it more difficult to introduce the ring 9 in this bore, the outside diameter of this flange 12a is made less than that of the bore 3.

This flange 12a could moreover having a conically tapered cross section, as shown in the embodiment of FIG. 3, instead of a cylindrical cross section, which forms near the free end a convergent portion 12c facilitating the placing in position of the ring.

Figure 2:
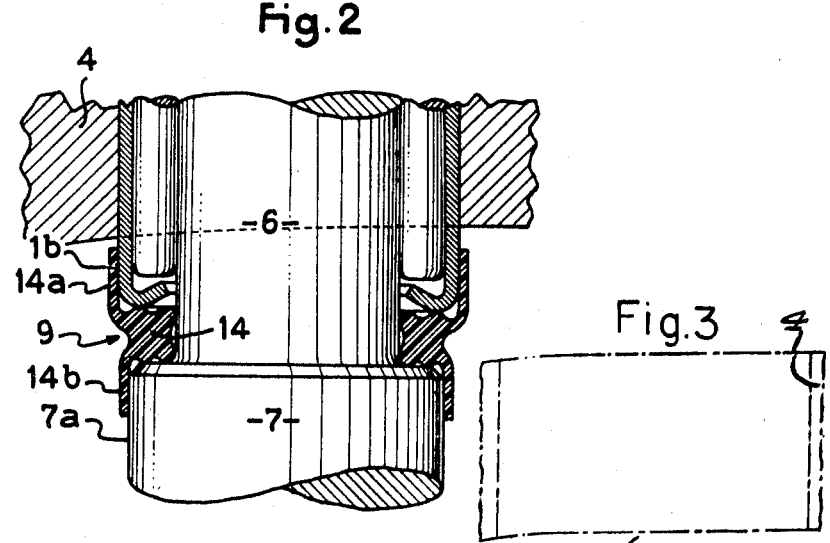
FIG. 2 is a sectional view of a modification of the device shown in FIG. 1.

In the embodiment shown in FIG. 2, the main part 14 of the ring 9 has a quadrilobar section and the cylindrical flanges 14a and 14b are respectively in contact with adjacent cylindrical faces 1b of the bearing 1 and 7a of the cross body 7. A substantially V-sectioned annular recess will be observed between the flanges 14a and 14b.

Such a contact, which tends to improve the protection against exterior influences, could be completed by the presence on the flanges 14a and 14b, or on one of them, of a rib or bead similar to the bead 12b shown in FIG. 1, which engages in a corresponding groove formed in the outer face of the bearing 1 and/or of the cross body 7.

Although specific embodiments of the invention have been described, many modifications and changes may be made therein without departing from the scope of the invention as defined in the appended claims.

Having now described my invention, what I claim as new and desire to secure by Letters Patent is:

1. In a universal joint comprising means defining a cross having four journals, two yokes interconnected by the journals of the cross which are engaged in bores in branches of the yokes with interposition of bearings and a sealing device interposed between a shoulder on each journal and an end flange of the corresponding bearing, said device consisting of an elastically yieldable single-piece ring having a portion surrounding with a tight fit an outer face of the corresponding journal and axially gripped between a face of the bearing and the shoulder on the journal, said ring portion having an annular face in direct-sealing contact with a minor part of said bearing end flange and annular faces in contact with said journal and said shoulder, the feature that said ring has a nonmetallic surface and an annular flange integral with said ring portion, and each bearing has a portion which extends beyond the inner face of the corresponding branch of the yoke radially inwardly of the universal joint and is combined to cooperate with the corresponding annular flange which extends first radially and then axially of the bearing directly from said face of said ring portion which is in direct-sealing contact with the bearing end flange, said outer face of said extending portion being cylindrical and said annular flange having a substantially cylindrical portion which surrounds said extending portion of the bearing and defines a free edge of said annular flange and has in a free state an inside diameter no less than the outside diameter of said extending portion of the bearing so as to be unstretched by said extending portion.

2. In a universal joint comprising means defining a cross having four journals, two yokes interconnected by the journals of the cross which are engaged in bores in branches of the yokes with interposition of bearings and a sealing device interposed between a shoulder on each journal and an end flange of the corresponding bearing, said device consisting of an elastically yieldable single-piece sealing ring having a portion surrounding with a tight fit an outer face of the corresponding journal and axially gripped between a face of the bearing and the shoulder on the journal, said ring portion having an annular face in direct-sealing contact with a minor part of said bearing end flange and annular faces in contact with said journal and said shoulder, the feature that said ring has a nonmetallic surface and a first annular flange integral with said ring portion, and each bearing has a portion which extends beyond the inner face of the corresponding yoke branch radially inwardly of the universal joint and is combined to cooperate with said first annular flange which extends axially of the bearing end flange directly from said face of said ring portion which is in direct-sealing contact with the bearing, said outer face of said extending portion being cylindrical and said annular flange having a substantially cylindrical portion which surrounds said extending portion of the bearing and defines a free edge of said annular flange and has in a free state an inside diameter no less that the outside diameter of said extending portion of the bearing so as to be unstretched by said extending portion, and a second annular flange which is integral with the ring and extends directly from said face of said ring portion in direct-sealing contact with said shoulder and includes an annular portion which surrounds a cylindrical outer portion of the journal which is beyond said shoulder relative to said bearing.

3. A universal joint as claimed in claim 1, wherein said flange has a radial thickness less than the radial thickness of said portion of said ring and is more flexible than said portion of said ring.

4. A universal joint as claimed in claim 2, wherein the outer face of said second annular flange is conical and tapers from an end of said second annular flange which is adjacent said portion of said ring.

5. A universal joint as claimed in claim 1, wherein said flange is in radially spaced relation to said cylindrical outer face of said extending portion of the bearing.

6. A universal joint as claimed in claim 2, wherein said second flange of the ring is in close contact with said cylindrical outer portion of the journal.

7. A universal joint as claimed in claim 1, wherein said portion of the ring has an outside diameter less than the outside diameter of the bearing and comprises an outer annular recess between said flanges.

8. A universal joint as claimed in claim 2, wherein said second flange and said portion of the ring have outside diameters less than the outside diameter of the bearing, a substantially V-sectioned annular recess existing between said flanges.